April 30, 1963    E. METZMEIER    3,087,330
FORCE MEASURING

Filed Aug. 4, 1959    4 Sheets-Sheet 1

Inventor:
ERWIN METZMEIER,
By
His Attorney.

April 30, 1963 E. METZMEIER 3,087,330
FORCE MEASURING
Filed Aug. 4, 1959 4 Sheets-Sheet 2
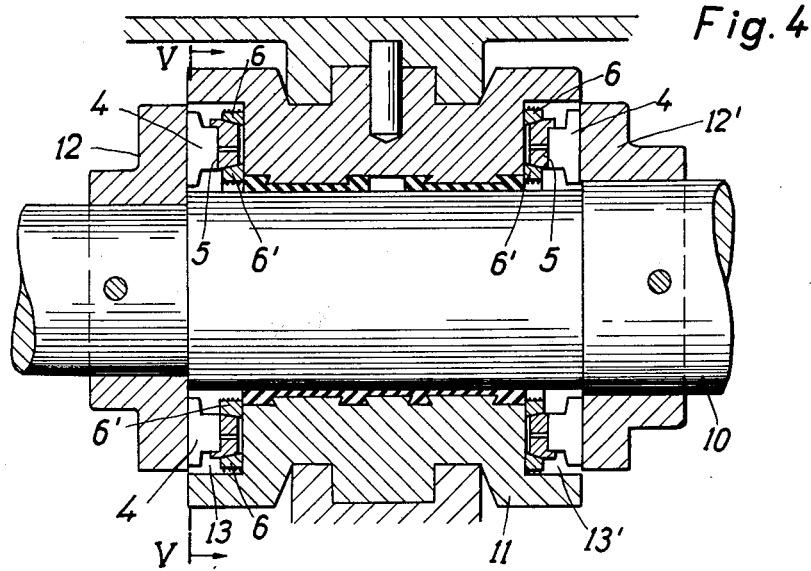
Fig. 4
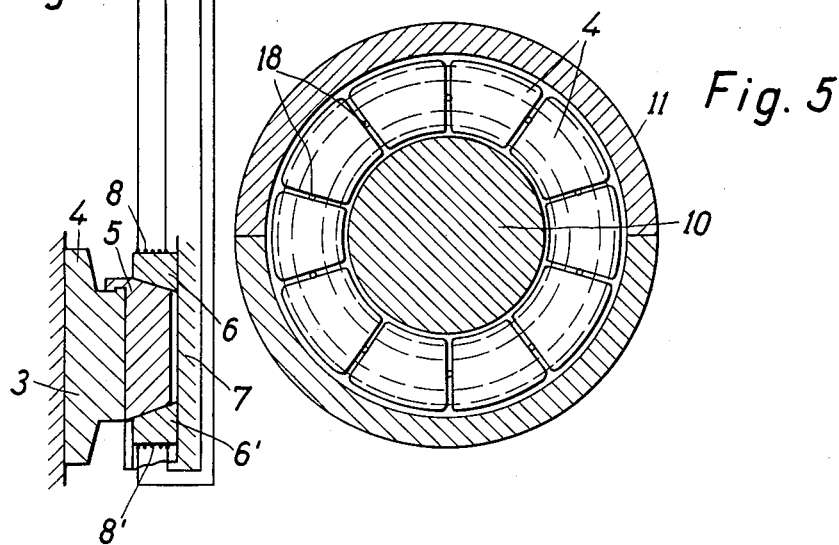
Fig. 3
Fig. 5
Inventor:
ERWIN METZMEIER
His Attorney April 30, 1963   E. METZMEIER   3,087,330
FORCE MEASURING
Filed Aug. 4, 1959   4 Sheets-Sheet 3

Inventor:
ERWIN METZMEIER,
By *[signature]*
His Attorney.

April 30, 1963 E. METZMEIER 3,087,330
FORCE MEASURING

Filed Aug. 4, 1959 4 Sheets-Sheet 4

Inventor:
ERWIN METZMEIER,
His Attorney.

United States Patent Office 3,087,330
Patented Apr. 30, 1963

3,087,330
FORCE MEASURING
Erwin Metzmeier, Sodenerstrasse 24, Berlin-
Wilmersdorf, Germany
Filed Aug. 4, 1959, Ser. No. 831,584
8 Claims. (Cl. 73—140)

The invention relates to an apparatus for measuring forces, more particularly for determining the forward or backward propelling force exerted on water craft or aircraft by the driving mechanisms thereof.

Apparatus used hitherto for the purpose specified, such as hydraulic load-measuring cells, expansion-measuring strips, piezo-electric and magneto-electric transmitting means and also optically or photo-electrically operating devices, has the disadvantage of requiring a considerable amount of space and generally gave measurement results of inadequate accuracy owing to the necessity, unavoidable in most cases, of using a considerable number of co-operating transmitting elements whose overall measuring accuracy was prejudiced by disturbing influences which varied locally and due to assembly.

These disadavntages of the known apparatus are all the more serious since the high standards as regards economical operation which are expected for example of driving mechanisms for water craft and aircraft need very accurate measurement of the forward or backward propelling forces which are exerted by such driving mechanisms in the most diverse working conditions on water craft or aircraft. At the same time, however, the space available for accommodating apparatus used merely for measuring or controlling purposes is very limited. For the space required, particularly for avoiding deformation and vibration phenomena in the achievement of a mechanically satisfactory construction of the parts used for transmitting these forces is in any case so great that, for example, the increase in the overall length of the thrust bearing of a ship's driving shaft by the interposition of hydraulic load-measuring cells between a shaft collar and the bearing surfaces becomes unacceptable.

On the other hand, the highly competitive requirements expected nowadays, for example, in respect of the economical running of ships makes it absolutely necessary to have a very accurate continual supervision of, more particularly, the forward propelling force produced by the driving mechanism under many different working conditions, especially since for judging ship's manoeuvres there has recently been a change-over to using the propeller thrust and not the driving speed of rotation as the basis.

It is already known in the case of load-measuring cells for pit props to use annular springs on whose outer and inner rings expansion-measuring strips are arranged. By connecting these measuring strips to appropirate electrical indicating devices, it was possible to measure in this way the forces occurring in the pit props.

Expansion-measuring elements are also known wherein a member in the shape of a circular plate and bendable under the action of shearing forces is provided at both sides with expanding rims which are disposed perpendicularly to the plate plane and whose peripheries increase or decrease when the plate is bent, and which are provided with resistant material whose resistance varies with the deformation of the expanding rims.

The aforesaid known load-measuring cells, however, are not suitable for measuring forces in all cases. Particular difficulty is found if the force-transmitting parts are connected for example to the driving mechanisms of water craft or aircraft. In these cases it is necessary to measure the forward or backward propelling forces exerted on the craft by the driving mechanisms without the measuring apparatus having to take up a considerable amount of space. Furthermore, a measuring apparatus of this kind must also be suitable for dealing with relatively large and rapidly succeeding variations in the forces being measured, whereas on the other hand the force-transmitting part must not be subjected to tilting forces which falsify the measurement result and prejudice the working reliability of the apparatus.

The invention provides an apparatus for measuring forces which takes these conditions into account. It takes up scarcely any space in the direction of the force being measured, makes it possible to carry out highly dynamic measurements and prevents the occurrence of tilting stresses at the force-transmitting parts.

According to the invention, these advantages are achieved in that, more particularly for carrying out dynamic measurements, there are provided two annular springs whereof one acts from outside and the other from inside on conical or spherical surfaces arranged externally and internally respectively on the force-transmitting part.

In this way, the invention provides an apparatus for measuring forces which takes up very little space and at the same time permits very great measuring accuracy and which consequently is particularly suitable for fitting in the driving mechanisms of water craft and aircraft.

The invention can be carried into effect in a particularly advantageous manner if the spring element is constructed as an annular spring which is provided preferably with at least one conical surface for receiving the force to be measured.

It is advantageous in certain cases if the spring element is constructed as a cup spring provided preferably with at least one conical surface for receiving the force to be measured.

If the apparatus is intended to be fitted in thrust bearings having a plurality of thrust shoes arranged on their periphery (Mitchell bearing) according to the invention the apparatus can be so constructed that the outer and/or inner sides of the segment holders are provided with conical surfaces which bear on the conical inner and/or outer surfaces of the annular or cup spring surrounding them and/or surrounded by them.

In order to make the deformation of the annular spring element measurable in a simple manner, the apparatus according to the invention can be so constructed that the annular or cup spring is provided at its periphery with one or more turns of an electric conductor which is insulated or is arranged in an insulated manner on the said spring, and whose electric resistance undergoes under the influence of a mechanical deformation variations which can be measured in a manner known per se.

With this construction of the apparatus, according to the invention the measuring operation can be carried out in a particularly sensitive fashion if the measuring wire arranged on the periphery of the annular spring element is arranged in a labyrinth pattern in a manner known per se.

In order to obtain a particularly economical or effective drive for propeller-driven water craft or aircraft, the apparatus can be constructed according to the invention in such a manner that it is arranged as a transmitting means in an automatic variable-pitch propeller arrangement for maintaining the optimum angle of attack in each case for every working state of the driving mechanism.

In order to obtain a measuring accuracy which is not prejudiced by temperature influences in the case of force-transmitting arrangements wherein different temperatures occur, more particularly temperatures varying from the ambient temperature, the apparatus according to the invention can be so constructed that a non-loaded ring or a disc of the same material as the spring element used for measuring is provided which is subjected to the same temperature conditions as the latter and is used in a manner known per se for the compensation of the influence exerted on the measurement result by the temperature of the spring element used for measuring purposes.

More particularly in cases where it is desirable in the carrying out of dynamic measurement to have the measurement result uninfluenced by frictional forces occurring between the measuring ring and the force-transmitting part, the apparatus according to the invention can be so constructed that in order to avoid friction between the force-transmitting part and the spring element one of these two parts e.g. by means of per se known magnetostrictive oscillation generator, is made to carry out elastic oscillations in the direction perpendicularly to the force-transmitting surface.

The carrying-out of dynamic measurements, wherein the force being measured varies its direction, is facilitated according to the invention in that two annular spring elements, preferably annular springs, are provided one of which acts from the outside and the other from the inside on conical or spherical surfaces arranged externally and internally respectively on the force-transmitting part.

The measuring accuracy which can be attained with the apparatus is particularly advantageous more especially for carrying out dynamic measurements with a varying force direction, if the apparatus is so constructed according to the invention that there is provided only one annular spring element which is in contact, with some pre-loading, with the conical or spherical surface arranged on the force-transmitting part.

Two examples of embodiment of the invention are illustrated in the accompanying drawings, wherein:

FIGURE 3 shows the arrangement of measuring wires on annular springs adjoining a segment holder;

FIGURE 4 is a longitudinal sectional view through a journal and thrust bearing for a turbine subjected to pressure from both sides.

FIGURE 5 is a sectional view taken on the line V—V of FIGURE 4.

Figure 1:
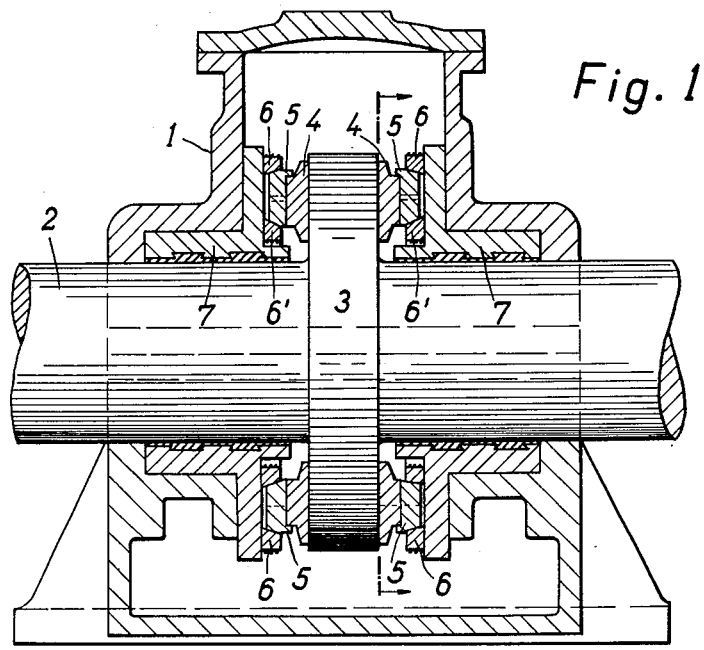
FIGURE 1 is a longitudinal sectional view through a thrust bearing for a ship's driving shaft.
Figure 2:
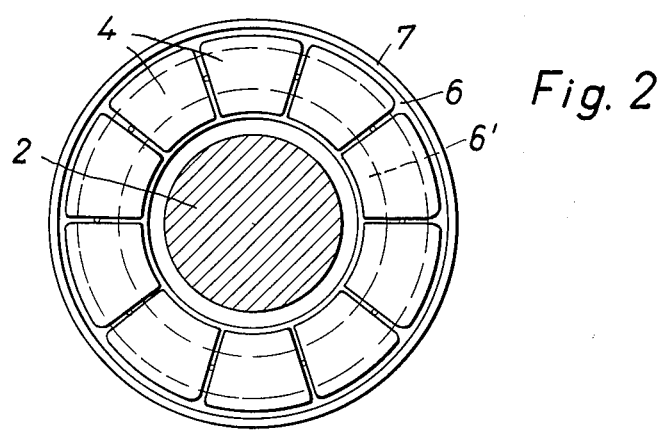
FIGURE 2 is a sectional view taken on the line II—II of FIGURE 1.
Figure 6:
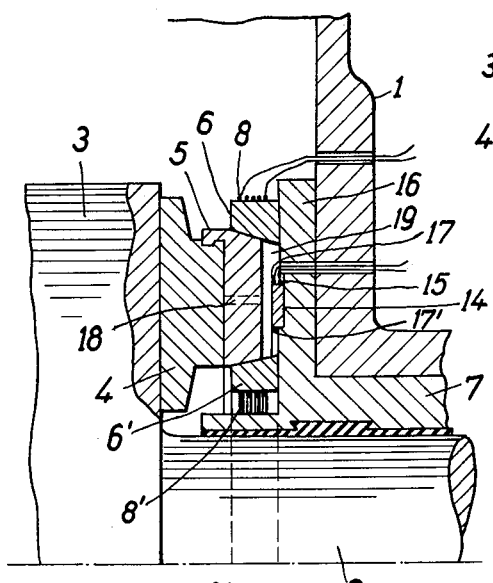
FIGURE 6 is a sectional view through an apparatus according to the invention provided with a temperature-compensating device.

In the example shown in FIGURES 1 and 2, 1 designates the housing of a per se known single-collar thrust bearing used chiefly for ship's drives, wherein a shaft 2 made in one piece is provided in the middle of the bearing with a thrust collar 3. The thrust collar runs at both sides on loose thrust shoes 4 (Michell thrust blocks), which bear against both sides of the thrust collar and do not participate in the rotation of the shaft. The segment-shaped thrust shoes 4 are carried by segment holders 5 which bear with conically shaped outer and inner surfaces against two measuring rings or annular springs 6, 6', the axial pressure exerted thereby being transmitted to the bearing brasses 7 of the thrust bearing housing.

The annular spring 6 is opened in the radial direction by the thrust force whereas the annular spring 6' bearing against the inner surface of the segment holder is compressed. The outer annular spring can be a continuous ring since its diameter is of such a size that it can be passed over the connecting flanges which are not shown in the drawings. The inner ring can be divided without prejudicing its action.

Bearing against the periphery of the two annular springs 6, 6' in several turns and in an insulated fashion are electric conductors 8, 8' (see FIGURE 3) whose electric resistance under the influence of the mechanical deformation acting on them undergoes measurable variations, and they are connected to a measuring instrument 9 which is arranged outside the thrust bearing (FIGURES 3).

Instead of resistance-measuring wires as illustrated in the drawings, it is also possible to use expansion-measuring strips. Both the measuring wires 8, 8' which can be arranged in labyrinth fashion in a known manner, and also the expansion-measuring strips must be so connected in a manner known per se e.g. by gluing, to the surface of the measuring rings 6, 6' that they undergo the same deformations as the latter.

In the journal and thrust bearing shown in FIGURE 4 for a steam turbine, there are arranged on the shaft 10, adjoining both ends of the bearing member 11, thrust collars 12, 12' which bear on the thrust shoes 4 arranged loose in a circular recess 13, 13'. The thrust exerted by the collars 12, 12' is transmitted through the shoes 4 to the segment holder 5 which bears by means of its conical surfaces against the two annular springs 6, 6' bearing against the bearing member 11.

The arrangement of the measuring wires or measuring strips on the annular springs is the same as in the preceding example.

The measurement result obtained for example by the measuring instrument 9 (FIGURE 3) according to the invention can be made independent of temperature influences acting on the measuring wires 8, 8' by providing a compensating device. This consists e.g. of a ring 14 which is arranged in the vicinity of the measuring ring 6 and preferably consists of the same material as the measuring rings and is subjected to approximately the same temperatures as the measuring rings. This ring 14 is so arranged that it is not deformed by the force being measured and that its thermal expansion is not prevented. For this purpose, it can be arranged, for example, in a groove 15 on the inner side of the collar 16 within the measuring ring 6 and concentric thereto, the width of the groove 15 being greater than the width of the compensating ring 14 including the measuring wires 17, 17' fixed thereto. The latter are also connected in a manner known per se with the measuring instrument 9 and are so arranged that the temperature variations of the measuring rings 6 and 6' are compensated by the corresponding resistance variations of the measuring wires 17, 17'. In order to guarantee as close temperatures as possible at the measuring rings 6, 6' and the compensating ring 14, the annular segment holder 5 can be provided between the individual segments 4 with holes 18 which are axially directed and establish communication between the space surrounding the measuring ring 6 and the inner space 19 in which the compensating ring 14 is situated. These connecting holes 18 also give the lubricant filling the entire bearing adequate access to the compensating ring 14.

Figure 7:
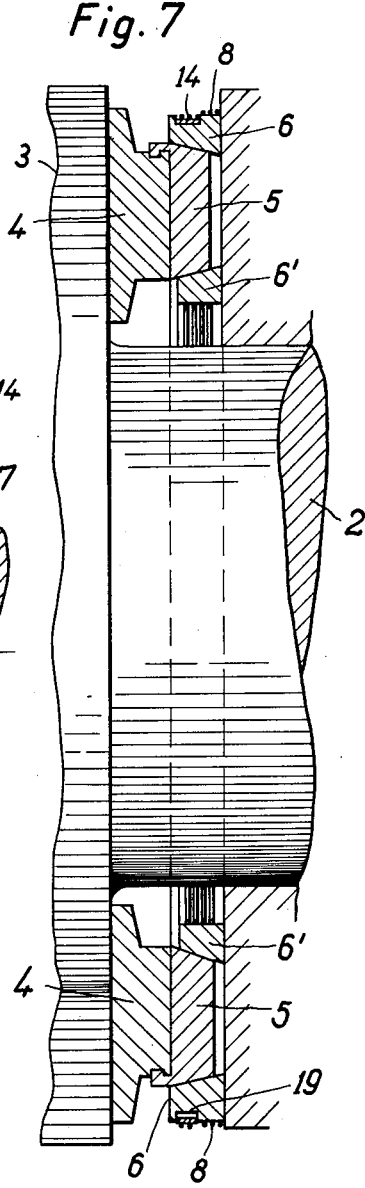
FIGURE 7 is a sectional view through an apparatus according to the invention provided with another constructional form of the temperature-compensating device.

As shown in FIGURE 7, the compensating ring can also be so constructed that it is situated immediately adjacent the measuring wires 8 on the periphery of the measuring ring 6 in a groove 19 arranged therein which is so deep that the compensating ring 14 can expand or contract under the influence of heat, unhindered, in the radial direction. This construction guarantees obtaining a particularly effective compensating action.

Figure 8:
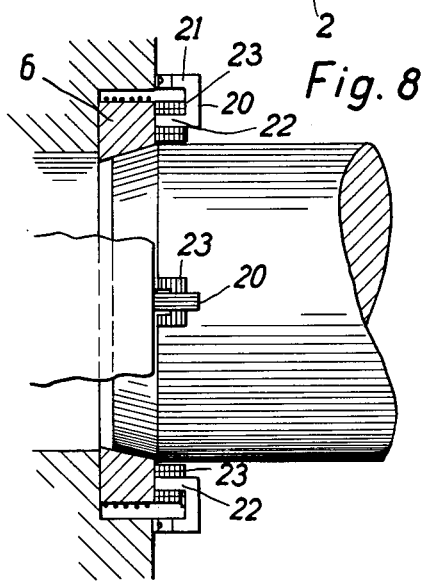
FIGURE 8 is a sectional view through an apparatus according to the invention provided with a friction-reducing device.

When carrying out dynamic measurements, wherein the direction of the force acting on the apparatus may vary, the measurement result in some circumstances is falsified by the action of the frictional forces occurring between the measuring ring and the force-transmitting part. In order to avoid such disturbances, the apparatus can according to the invention be provided with means for reducing friction. Such means can be for example devices for generating mechanical oscillations, preferably of relatively high frequency, which operate magnetostrictively, or electromagnetically or electrodynamically. Such oscillation generators can be arranged distributed symmetrically over the periphery of the measuring ring 6, as shown in FIGURE 8. They then expediently consist of U-shaped cores 20 which are preferably laminated in order to reduce eddy current losses and which are fixed with one limb 21 to the bearing or any other fixed part of the machine and bear with their other limb 22, which carries the field coil 23, against the free end face of the measuring ring 6. When the coils 23 are supplied with alternating current, preferably of about 2,000 to 20,000 cycles per second, the cores 20 transmit mechanical oscillations of this frequency to the measuring ring, which consequently undergoes elastic deformations of very small amplitude and like frequency. These result in reducing the friction between the conical inner surface of the measuring ring 6 and the conical surface at the force-transmitting part. The friction between the measuring ring 6 and the force-transmitting part is thereby reduced in a manner which is sufficient for obtaining adequately accurate measurement results.

Figure 9:
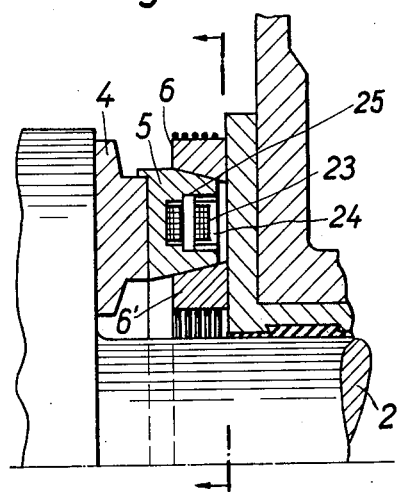
FIGURE 9 is a sectional view through an apparatus according to the invention provided with another form of embodiment of the friction-reducing device.
Figure 10:
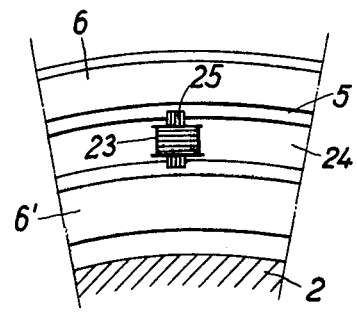
FIGURE 10 is a fragmentary elevational view of the apparatus according to the invention provided with a friction-reducing device as illustrated in FIGURE 9.
Figure 11:
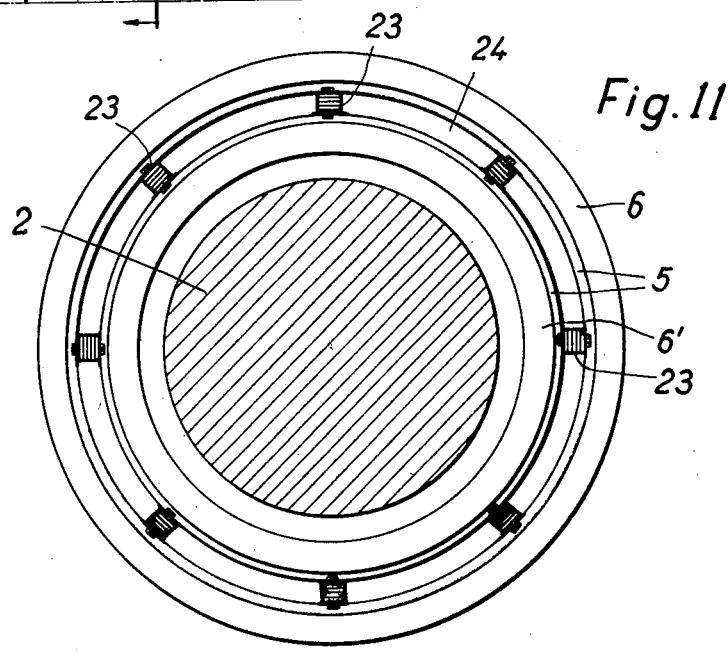
FIGURE 11 is an overall view of the apparatus according to the invention provided with a friction-reducing device as illustrated in FIGURES 9 and 10.

The friction-reducing device can be also constructed in the manner according to FIGURES 9 to 11, such that the oscillation generators are distributed symmetrically over the periphery of a groove 24 arranged in the segment holder 5 itself, and consist of preferably laminated cores 25 which extend in the radial direction and which bear with their end faces on the outer and inner side walls of the groove 24. They are secured against lateral displacement, fitted into the groove 24 with some pre-tension, and carry at their periphery the coils 23. The oscillation generators 25, 23 can be distributed over the periphery of the groove in such numbers as to achieve an adequately strong action on the inner and outer cones of the segment holder 5 by the oscillation generators to achieve the reduction in friction between the measuring rings and the force-transmitting part which is necessary for obtaining adequately accurate measurement results, more particularly when carrying out dynamic measurements.

Many different forms of embodiment of the invention are possible. The forms of embodiment described hereinbefore and illustrated in the drawings constitute merely examples of constructional forms in which the invention can be embodied.

What I claim and desire to secure by Letters Patent is:

1. A thrust gauge, for use in connection with a rotatable drive shaft having a thrust collar and a non-rotating bearing structure, the combination of two annular springs supported by said bearing structure and defining therebetween a tapered outward flaring endless groove, tapered means engaged in said groove and operable when pressed to compress the inner spring radially inwardly and to tension the outer spring radially outwardly, thrust means disposed between the thrust collar and said tapered means and operable to transmit the thrust of said shaft to said tapered means, electrically conductive expansion transducer means connected to said springs and comprising an electric measuring conductor wound in at least one continuous turn about each spring though electrically insulated therefrom and being operable to have the electric conductivity varied by the expansion and respectively contraction spring movements, and an electric circuit including said transducer means and a measuring instrument whereby said thrust may be measured by said instrument.

2. A thrust gauge, as claimed in claim 1, said thrust means comprising thrust shoes, said tapered means comprising thrust shoe holders each having conical inner and outer surfaces engaging said groove.

3. Apparatus according to claim 1, characterised by the labyrinth arrangement of the measuring wire.

4. A thrust gauge, as claimed in claim 1, and temperature compensating means comprising an expandable ring disposed in said groove outside the thrust path of said tapered means and composed of the same material as said springs and comprised in said circuit.

5. A thrust gauge, as claimed in claim 1, and friction reducing means comprising a series of oscillators distributed uniformly along the periphery of said groove and in vibration transmitting connection with said tapered means.

6. A thrust gauge, as claimed in claim 1, said annular springs forming a first mechanism, said tapered means forming a second mechanism engaged by said first mechanism, and means operable for reducing friction between said mechanisms comprising a vibration generator connected to one of said mechanisms to impart thereto oscillations.

7. A thrust gauge, as claimed in claim 1, said bearing structure including a collar having a surface forming the bottom of said endless groove opposite said tapered means, an annular recess defined in said surface and extending throughout a fraction of said bottom and intercommunicating with said endless groove, and temperature compensating means comprising an expandable ring having a portion located in said annular recess and extending into said groove and being disposed concentrically with said annular springs and spaced from said tapered means, the width of said annular recess being in excess of the width of said expandable ring.

8. A thrust gauge, as claimed in claim 1, said tapered means having a series of holes terminating in said groove opposite said expandable ring and channels intercommunicating with said grooves and terminating adjacent said annular springs thereby establishing communication between the interior of said endless groove adjacent said expandable ring and the space surrounding the annular springs.

References Cited in the file of this patent

UNITED STATES PATENTS

| | | |
|---|---|---|
| 654,103 | Schrottke | July 17, 1900 |
| 1,998,450 | Davis | Apr. 23, 1935 |
| 2,544,567 | Rundell | Mar. 6, 1951 |

FOREIGN PATENTS

| | | |
|---|---|---|
| 468,238 | Italy | Dec. 29, 1951 |
| 790,057 | Great Britian | Feb. 5, 1958 |